(12) United States Patent
Palin et al.

(10) Patent No.: US 9,417,934 B2
(45) Date of Patent: Aug. 16, 2016

(54) INFORMATION DISTRIBUTION IN A DYNAMIC MULTI-DEVICE ENVIRONMENT

(75) Inventors: Arto Palin, Viiala (FI); Juha-Matti Tuupola, Tampere (FI); Olli Tyrkkö, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1743 days.

(21) Appl. No.: 11/848,739

(22) Filed: Aug. 31, 2007

(65) Prior Publication Data

US 2009/0063683 A1 Mar. 5, 2009

(51) Int. Cl.
*G06F 15/173* (2006.01)
*G06F 9/54* (2006.01)

(52) U.S. Cl.
CPC ...................................... *G06F 9/544* (2013.01)

(58) Field of Classification Search
CPC ....................................................... G06F 9/544
USPC ......................................................... 709/226
See application file for complete search history.

(56) References Cited

U.S. PATENT DOCUMENTS

| | | | | |
|---|---|---|---|---|
| 5,822,598 | A | * | 10/1998 | Lam ................................ 713/324 |
| 6,148,377 | A | * | 11/2000 | Carter et al. .................... 711/147 |
| 6,601,093 | B1 | | 7/2003 | Peters |
| 6,604,140 | B1 | | 8/2003 | Beck et al. |
| 6,879,561 | B1 | | 4/2005 | Zhang et al. |
| 6,909,721 | B2 | | 6/2005 | Ekberg et al. |
| 7,352,998 | B2 | | 4/2008 | Palin et al. |
| 7,590,097 | B2 | | 9/2009 | Ekberg et al. |
| 7,668,565 | B2 | | 2/2010 | Ylanen et al. |
| 7,697,893 | B2 | | 4/2010 | Kossi et al. |
| 2003/0100308 | A1 | | 5/2003 | Rusch |
| 2003/0236890 | A1 | | 12/2003 | Hurwitz et al. |
| 2004/0019640 | A1 | * | 1/2004 | Bartram et al. ................ 709/205 |
| 2005/0003822 | A1 | | 1/2005 | Aholainen et al. |

(Continued)

FOREIGN PATENT DOCUMENTS

| | | |
|---|---|---|
| EP | 1542409 A1 | 6/2005 |
| EP | 1758312 A1 | 2/2007 |

(Continued)

OTHER PUBLICATIONS

Rekimoto, "A multiple device approach for supporting whiteboard-based interactions," Conference on Human Factors in Computing Systems archive, Proceedings of the SIGCHI conference on Human factors in computing systems, Los Angeles, California, United States, pp. 344-351, (1998).

(Continued)

*Primary Examiner* — Kevin Mai
(74) *Attorney, Agent, or Firm* — Core Wireless Licensing, Ltd.

(57) ABSTRACT

A system for managing operation of a "whiteboard" supported by one or more devices. A whiteboard may comprise a shared storage area allocated amongst the memories of one or more devices enabled for wireless communication. The whiteboard may be accessed by various programs, or "nodes," resident on the devices. In at least one scenario, some nodes may provide information to a whiteboard section of one device for use by nodes that may exist on other devices. This information may be accessible via wireless communication The present invention may evaluate the requirements of the various active nodes in view of the status of the plurality of devices in order to both optimize whiteboard operation while conserving device resources.

25 Claims, 8 Drawing Sheets

(56) References Cited

U.S. PATENT DOCUMENTS

| | | | |
|---|---|---|---|
| 2005/0013259 A1 | 1/2005 | Papoushado et al. | |
| 2005/0066033 A1 | 3/2005 | Cheston et al. | |
| 2005/0071879 A1 | 3/2005 | Haldavnekar et al. | |
| 2005/0097087 A1 | 5/2005 | Punaganti et al. | |
| 2005/0114448 A1 | 5/2005 | Skomra et al. | |
| 2005/0138173 A1 | 6/2005 | Ha et al. | |
| 2005/0193106 A1 | 9/2005 | Desai et al. | |
| 2005/0254472 A1 | 11/2005 | Roh et al. | |
| 2006/0129850 A1* | 6/2006 | Hassan et al. | 713/300 |
| 2006/0140146 A1 | 6/2006 | Funk et al. | |
| 2006/0259506 A1 | 11/2006 | Kim | |
| 2006/0259606 A1 | 11/2006 | Rogers et al. | |
| 2007/0058630 A1 | 3/2007 | Fujimoto | |
| 2007/0141984 A1 | 6/2007 | Kuehnel | |
| 2007/0180073 A1 | 8/2007 | Paul et al. | |
| 2008/0025330 A1* | 1/2008 | Wang | 370/406 |

FOREIGN PATENT DOCUMENTS

| | | |
|---|---|---|
| EP | 1858210 A1 | 11/2007 |
| KR | 10-0498908 B1 | 9/2005 |
| WO | 2004008793 A | 1/2004 |
| WO | 200795966 A1 | 8/2007 |
| WO | 2007095966 A1 | 8/2007 |

OTHER PUBLICATIONS

Frank et al., "A customizable shared information space to support concurrent design," Computers in Industry archive vol. 48 , Issue 1, Special issue: CSCW in design, pp. 45-57, (2002).

Tandler, "Software Infrastructure for Ubiquitous Computing Environments: Supporting Synchronous Collaboration with Heterogeneous Devices," Lecture Notes in Computer Science; vol. 2201 archive Proceedings of the 3rd international conference on Ubiquitous Computing table of contents, Atlanta, Georgia, USA, pp. 96-115, (2001).

International Search Report for International Application Serial No. PCT/IB2008/050711, dated Feb. 2, 2009.

Steenkiste, "A Systematic Approach to Host Interface Design for High Speed Networks," Computer, IEEE Service center, Los Alamitos, CA, US, vol. 27, No. 3, Mar. 1994, pp. 47-57.

Kliazovich et al., "A Delayed-ACK Scheme for MAC-Level Performance Enhancement of Wireless LANs", Telecommunications and Networking—ICT 2004; [Lecture Notes in Computer Science; LNCS], Springer-Verlag, Berlin/Heidelberg, vol. 3124, Jul. 2004, pp. 1289-1295.

International Search Report for International Application Serial No. PCT/IB2008/050709, dated Feb. 25, 2009.

Fodor et al., "Providing Quality of Service in Always Best Connected Networks", IEEE Communications Magazine, IEEE Service Center, Piscataway, US, vol. 41, No. 7, Jul. 2003, pp. 154-163.

Suoranta et al., "New Directions in Mobile Device Architectures", Digital System Design: Architectures, Methods and Tools, IEEE 2006, 9th Euromicro Conference on Digital System Design, Jan. 2006, pp. 17-26.

International Search Report for International Application No. PCT/IB2008/050708, dated Mar. 3, 2009.

Lee et al., "Protocols for Service Discovery in Dynamic and Mobile Networks", International Journal of Computer Research, vol. 11, No. 1, 2002, pp. 1-12.

The Salutation Consortium, "Salutation Architecture Specification (Part 1), Version 2.1" Salutation Architecture Specification, 87 pgs., Dec. 31, 1999, i-v, 1.

Lapetelainen et al., "Networked Systems, Services and Information", NOTA2008, 1st International network on Terminal Architecture Conference, Jun. 11, 2008, pp. 1-7.

Kronlof et al., "Advances in Design and Specification Languages for Embedded Systems", Jul. 19, 2007, Springer, Netherlands. pp. 285-300.

Desoli et al., "An Outlook on the Evolution of Mobile Terminals: From monolithic to modular multiradio, multiapplication platforms", IEEE Circuits and Systems Magazine, IEEE Service Center, New York, vol. 6, No. 2, Jan. 1, 2006, pp. 17-29.

Dobrev et al., "Device and Service Discovery in Home Networks with OSGi", In-Home Networking, IEEE Communications Magazine, Aug. 2002, 7 pages.

Miaoqing, "Service Discovery between Multiple Home Networks", TKK T-110.5190 Seminar on Internetworking, Mar. 4-5, 2007.

International Search Report and Written Opinion of the International Searching Authority for corresponding Patent Cooperation Treaty Application No. PCT/IB2007/054550 dated Oct. 15, 2008, 12 pages.

Se Gi Hong, et al: "Accelerating Service Discovery in Ad-Hoc Zero Configuration Networking" Global Telecommunications Conference, 2007. GLOBECOM '07. IEEE, IEEE, Piscataway, NJ, USA, Nov. 1, 2007, pp. 961-965, XP031196113 ISBN: 978-1-4244-1042-2, section II.

Celeste Campo, et al: "DNS-Based Service Discovery in Ad Hoc Networks: Evaluation and Improvements" Personal Wireless Communications Lecture Notes in Computer Science; LNCS, Springer Berlin, DE, vol. 4217, Jan. 1, 2006, pp. 111-122, XP019044018 ISBN: 978-3-540-45174-7, section 2.

Stuart Cheshire; Marc Krochmal, Apple Computer, et al: "DNS-Based Service Discovery; draft-cheshire-dnsext-dnssd-04.text" IETF Standard-Working-Draft, Internet Engineering Task Force, IETF, Ch, No. 4, Aug. 10, 2006, XP015046478 ISSN: 0000-0004, section 14.

International Search Report and Written Opinion for PCT/IB2008/053759 dated Mar. 27, 2009, 15 pages.

Quiroz, et al., "Version vectors based synchronization engine for mobile devices", Proceeding PDCN'07 Proceedings of the 25th conference on Proceedings of the 25th IASTED International Multi-Conference: parallel and distributed computing and networks 2007.

Final Technology Evaluation Report SIRENA Service Infrastructure for Real-time Embedded Networked Applications ITEA 02014 Project Reference WP2/110 Version V1.0 Author(s) / Organisation SIRENA Consortium Date May 14, 2004.

Lent, R.; "Smart packet-based selection of reliable paths in ad hoc networks" Design of Reliable Communication Networks, 2005. (DRCN 2005). Proceedings, 5th International Workshop on Oct. 16-19, 2005 p. 5 pp.

International Search Report and Written Opinion for PCT/FI2008/050242, dated Aug. 18, 2008, 12 pages.

Raverdy et al., "Efficient Context-aware Service Discovery in Multi-Protocol Pervasive Environments", Mobile Data Management, 7th International Conference, Conference Proceedings Article, IEEE, May 10, 2006.

Raverdy et al., "A Multi-Protocol Approach to Service Discovery and Access in Pervasive Environments", Mobile and Ubiquitous Systems: Networking & Services, 2006 Third Annual International Conference on Jul. 2006, IEEE 2006, pp. 1-9.

Kim et al., "Service Discovery Using FIPA-Compliant AP to Support Scalability in Ubiquitous Environments", Proceedings of the Fourth Annual ACIS International Conference on Computer and Information Science on 2005, pp. 647-652.

Scholten et al., "Secure Service Discovery in Home Networks", International Conference on Consumer Electronics, 2006, ICCE '06, 2006 Digest of Technical Papers, 7-11, Jan. 2006, pp. 115-116.

International Search Report and Written Opinion for PCT/IB2008/052437, dated May 1, 2009, 14 pages.

Rekimoto et al., "A Multiple Device Approach for Supporting Whiteboard-Based Interactions", Chi '98. Human Factors in Computing Systems, Conference Proceedings, Los Angeles, CA, Apr. 18-23, 1998.

Frank et al, "A Customizable Shared Information Space to Support Concurrent Design", Computers in Industry, Elsevier Science Publishers, Amsterdam, NL, vol. 48, No. 1, May 1, 2002, pp. 45-57.

Tandler, "Software Infrastructure for Ubiquitous Computing Environments: Supporting Synchronous Collaboration with Heterogeneous Devices", Lecture Notes in Computer Science, LNCS, vol. 2201/2001, Jan. 1, 2001, pp. 95-115.

Korean Intellectual Property Office Non-Final Rejection mailed in Korean Application No. 10-2010-7006862 on Jul. 1, 2011, 8pp.

(56) References Cited

OTHER PUBLICATIONS

Communication (EPO Form 1507N) dated Nov. 8, 2012 enclosing a two page European search report dated Oct. 30, 2012 citing documents D1-D3, and a seven page examination (EPO Form 1703 01.91 TRI) dated Nov. 8, 2012 in parallel European patent application 12180045.2-2211, 10 pages in total.

* cited by examiner

INFORMATION DISTRIBUTION IN A DYNAMIC MULTI-DEVICE ENVIRONMENT

BACKGROUND OF INVENTION

1. Field of Invention

The present invention relates to strategies for conveying information between one or more devices, and more specifically, to a system for managing data in a shared information space allocated between one or more devices in view of resource constraints in these devices.

2. Background

In general, a software program may include a set of instructions, executable by a processor, that are organized to receive input (e.g., data) for a calculation or determination that may then result in an output. Over the years, software technology has evolved to transform these individual instruction sets into modules that may in turn be integrated together to form the more complex programs we know today. Today's more-sophisticated software programs may receive various forms of input such as raw data, for example as stored in magnetic or optical storage, user input through various known types of user interfaces, measured or monitored information converted to electronic information from electronic and/or electromechanical sensors, etc.

In some instances, programs may be configured to produce data usable by other software applications. However, a problem may be presented in conveying the information from one program to another. If the relationship is known before the programs are created, then a specific strategy may be devised to convert one program's output into another program's input. Traditionally this strategy has led to functional but rigid software applications, requiring frequent and possibly substantial revisions due to changes in functionality, platform, architecture, etc.

Recently, more flexible modular architectures for sharing information amongst programs are emerging. At least one strategy may employ a shared memory space, colloquially called a "whiteboard" in tribute to white marker boards often used for conveying and sharing ideas in a group environment. A whiteboard may be a common memory area in which one or more programs may place data. These programs, or "nodes", may be modular constructs that can be revised or replaced without having to interrupt the operation of the whiteboard. Some nodes may communicate with the whiteboard in order to contribute information, while others may read previously stored information from the whiteboard or may combine these functions. Using this strategy, altering program elements (e.g., altering, adding or deleting one or more nodes) may not affect active nodes that are coupled to the whiteboard, and memory usage may be optimized since information may be stored in a single location while being accessible to all of the nodes.

The previously discussed whiteboard system may be apparent to implement on hard-wired stationary systems, but may be appreciably more difficult to structure when using a flexible network of wireless devices. Issues may include creating a whiteboard area when dealing with devices that may not always be present (e.g., accessible), may include changing requirements and may further be subject to resource constraints. For example, many mobile wireless devices are powered by local sources like batteries, and as a result, may be sensitive to processes that create constant activity, and therefore, a constant drain on the battery cells.

SUMMARY OF INVENTION

The present invention includes at least a method, computer program, device and system for managing the operation of one or more devices interacting with a shared memory area, or whiteboard. One or more nodes also resident on the plurality of devices may place data into or pull data from the whiteboard. A control strategy may be employed to support the requirements of the nodes while simultaneously conserving resources in the devices.

In at least one embodiment of the present invention, the whiteboard may comprise a common memory space allocated amongst one or more wireless communication devices. In this configuration, each device may contain within its memory a "section" of the whiteboard. Various nodes may interact with the whiteboard. Nodes may be hard-coded or software implemented programs. Nodes may also be classified by how they interact with the whiteboard, such as by whether they store data in the whiteboard, consume data from the whiteboard, or can be configured to perform either function. Because the whiteboard may be allocated amongst one or more wireless devices, it may become necessary for a consuming node on one device to obtain information from a node that stores information on a whiteboard section that is resident on another device. This data transfer between devices may be executed by wireless communication.

The present invention may, in at least one embodiment, monitor the activity of a whiteboard in view of the nodes that are actively reading and writing information to each section. This activity may further be compared to physical resources on each wireless communication device, and the operation of the whiteboard system may be altered in order to optimize resources in view of both whiteboard and device operation. For example, information stored on one device may be moved to another device based on the location of the consumers of the information (e.g., moving the information to a different whiteboard section). The same sort of alteration may also be made based on the availability of memory space in a wireless communication device. This optimization may continuously operate to ensure a balance of whiteboard access speed and resource conservation, such as memory or battery power, in the wireless communication devices.

DESCRIPTION OF DRAWINGS

The invention will be further understood from the following detailed description of various exemplary embodiments, taken in conjunction with appended drawings, in which.

DESCRIPTION OF EXEMPLARY EMBODIMENTS

While the invention has been described below in a multitude of exemplary embodiments, various changes can be made therein without departing from the spirit and scope of the invention, as described in the appended claims.

I. A Whiteboard and Nodes

Figure 1:
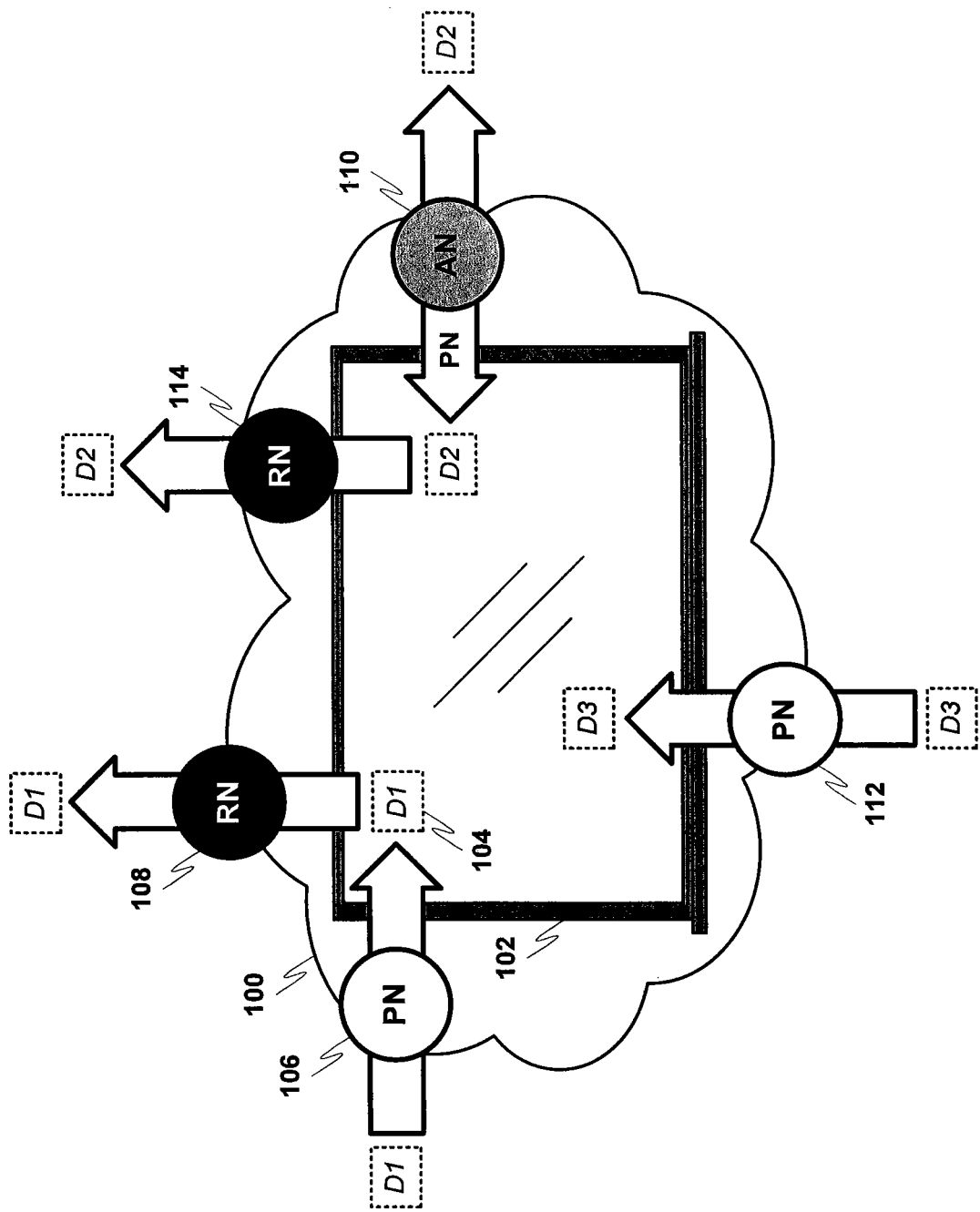
FIG. 1 discloses an exemplary whiteboard and nodes in accordance with at least one embodiment of the present invention.

Various embodiments of the present invention may comprise a whiteboard and nodes such as depicted in FIG. 1. An exemplary whiteboard 102 has been depicted in FIG. 1 in likeness to its real-world counterpart only for the sake of explanation in this disclosure. In actuality, electronic memory 100 may allocate space for whiteboard 102. Whiteboard 102 may be storage location where programs may place information, such as data 104, for other programs to use as input. These programs, or nodes, may be classified based on the way they interact with whiteboard 102. For example, nodes 106 and 112 are proactive nodes (PN). PN 106 and 112 may produce information for other programs enabled to access whiteboard 102. In this example PN 106 produces data D1 and supplies it to whiteboard 102 (shown at 104). For example, PN 106 may read data D1 from an electronic or electromechanical temperature sensor and places it into whiteboard 102 for consumption by other programs. This information may be periodically updated, refreshed on request, changed when the sensor detects a change in temperature, etc.

The information produced by a PN such as 106 or 112 may be consumed by at least two other types of modules. A reactive node (RN) may access whiteboard 102 in order to obtain stored information. In FIG. 1, RN 108 reads the data D1 supplied by PN 106. Continuing with the previous exemplary scenario, RN 108 may read the temperature data D1 supplied by PN 106 and evaluate if the temperature is within an acceptable range. If the temperature data D1 is not within an acceptable range, RN 108 may trigger an audible, visible or tactile alarm in order to notify the user of a wireless communication device on which RN 108 resides of a problem.

A PN only supplies data, and an RN only reads data. However, there is another higher-level node that may both read from and write to whiteboard 102. An Agent node (AN) may perform either a read or write based on the particular application being supported. In this example AN 110 is writing information to D2 to whiteboard 102, which is subsequently being read by RN 114. The fact that AN 110 is currently operating in a proactive mode is indicated in FIG. 1 by the "PN" indicia shown on the arrow pointing towards whiteboard 102. AN 110 may perform higher level functions. In accordance with the previous example, AN 110 may read the temperature data D1 produced by PN 106, and if the data D1 is outside an acceptable range, it may write new data D2 to whiteboard 102. This information may then be read by RN 114, which uses the D2 data to wirelessly alter a set point in a program for a building thermostat.

II. A Whiteboard Applied to One or More Wireless Devices

As discussed above, FIG. 1 is an example of a basic whiteboard configuration in accordance with at least one embodiment of the present invention. This architecture may be adequate when discussing a hard-wired stationary system with ample available processing power and memory, but it may not be applicable when implementing a whiteboard system on a platform including one or more wireless communication devices, which is discussed in FIG. 2.

Figure 2:
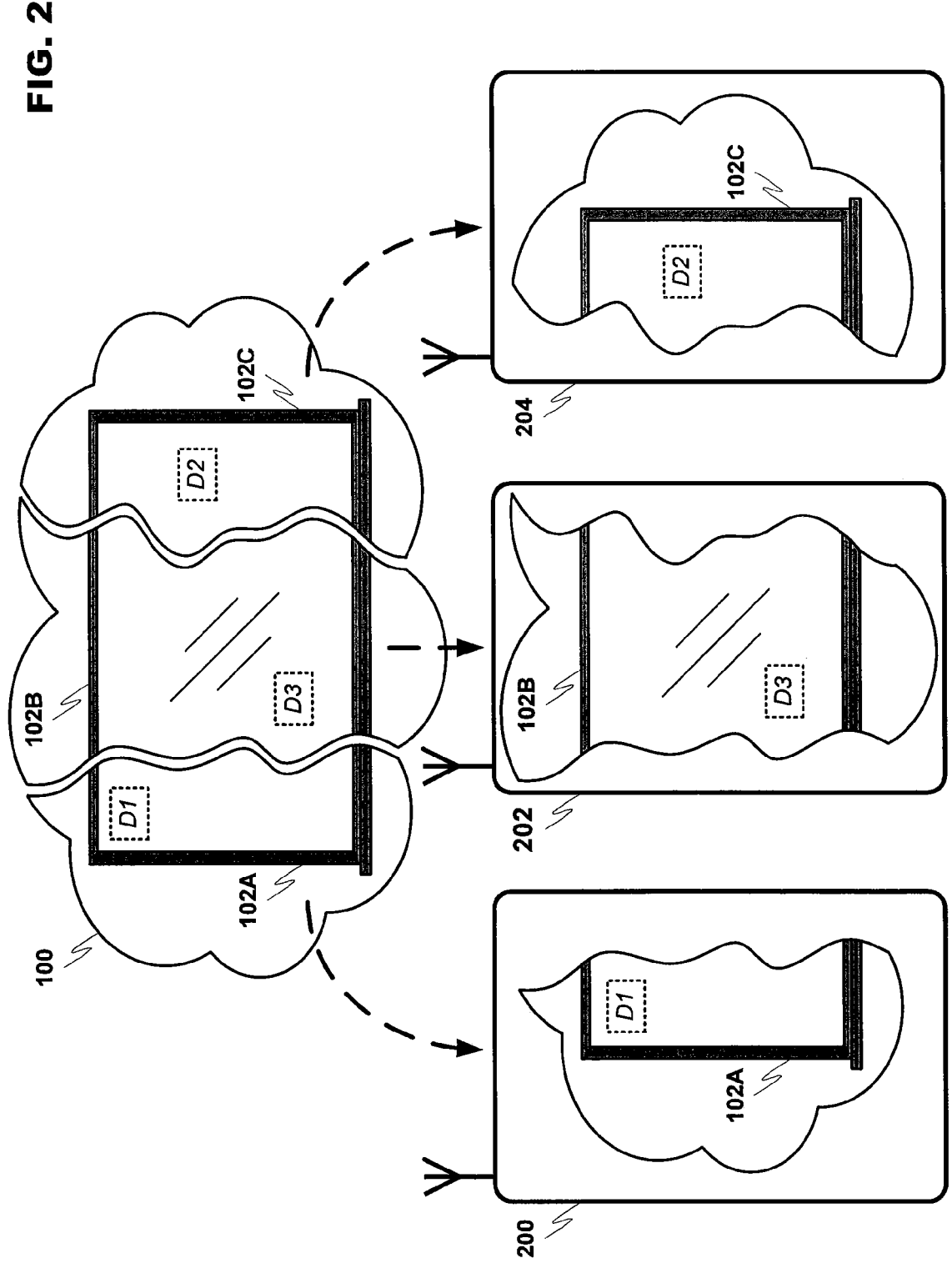
FIG. 2 discloses an exemplary allocation of a whiteboard to one or more wireless communication devices in accordance with at least one embodiment of the present invention.

FIG. 2 discloses an exemplary application of a whiteboard architecture to one or more wireless communication devices 200, 202 and 204 in accordance with at least one embodiment of the present invention. These devices may be mobile wireless devices such as cellular phones, personal digital assistants (PDA), palm top computers, mobile communicators that include elements of all of these devices, etc. In many instances, a single device many not include enough available resources (e.g., memory 100) to support the entire whiteboard 102 on a single device. Therefore, the whiteboard may be divided into "sections" that are each supported by a different device. FIG. 2 shows whiteboard 102 being divided into sections 102A, 102B and 102C. Each of these sections may be supported by one of the plurality of devices (e.g., 200, 202 and 204 as shown). It is important to note that while whiteboard 102 has been divided between the devices, from a programmatic standpoint whiteboard 102 is still a unified area in which data may be deposited. More specifically, while data D1, D2 and D3 reside on different devices, they all reside within the same whiteboard 102, and hence, changes in one whiteboard section may have to communicated to the other whiteboard sections residing on different physical devices.

Figure 3:
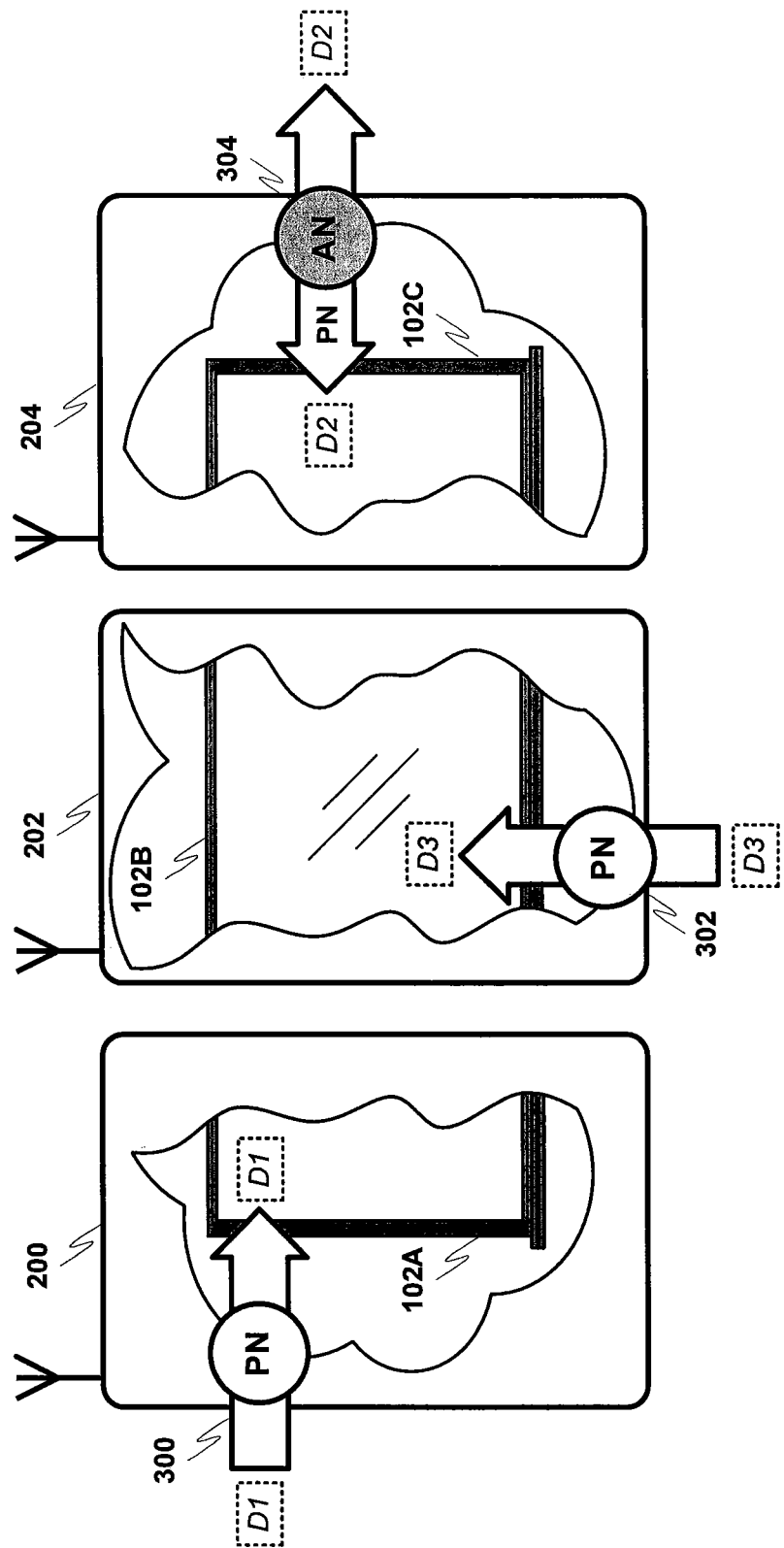
FIG. 3 discloses an example of the whiteboard that was allocated to the plurality of wireless communication devices in FIG. 2 interacting with various nodes in accordance with at least one embodiment of the present invention.

For the sake of explanation in this disclosure, the exemplary devices 200, 202 and 204 are all enabled to communicate via wireless communication. This wireless communication may include, for example, long-wireless communication such as via cellular mediums like GSM, CDMA, etc., short-range wireless communication through mediums like Bluetooth™, WLAN, Wibree™, etc., or any form of wireless communication suitable for conveying data from one device to another. Despite the fact that whiteboard 102 is divided between devices 200, 202 and 204, whiteboard 102 may still function as a singular storage area for program data. FIG. 3, discloses an example of how nodes acting in a proactive mode, for example PN 300, 302 and AN 304, may write information in accordance with at least one embodiment of the present invention. In the simplest scenario, PN 300 may reside on device 200 and write data D1 to the whiteboard section 102 A on device 200. Likewise, PN 302 may write data D3 to the whiteboard section 102B on device 202, and AN 304, acting in a proactive mode, may write data D2 to whiteboard section 102C on device 204. In this way, operation is segregated on each device so that local nodes are interacting with local whiteboard sections. However, this operational example may be oversimplified, as will be described with respect to FIG. 4.

Figure 4:
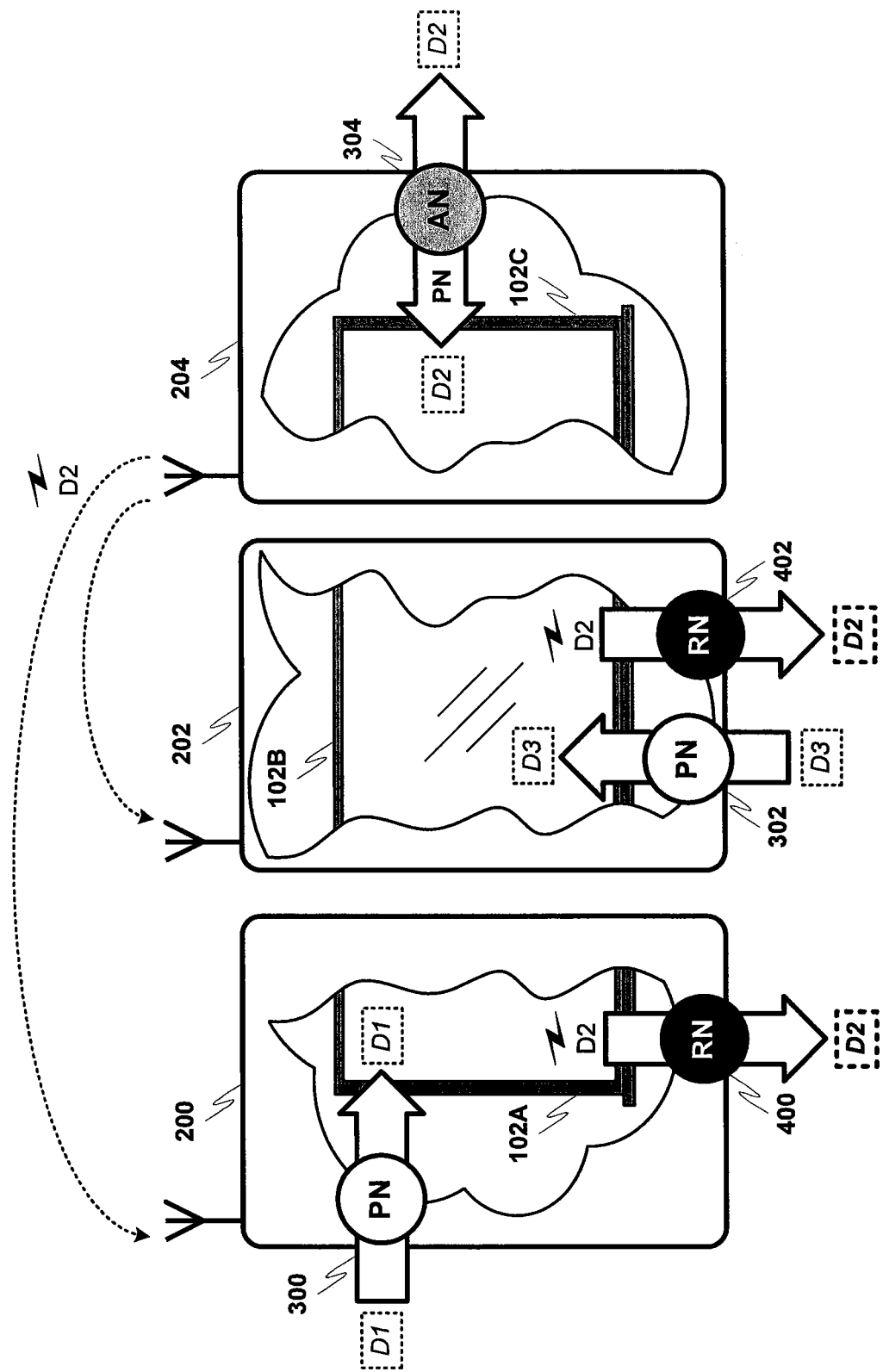
FIG. 4 discloses an example of a node receiving information via wireless communication in accordance with at least one embodiment of the present invention.

FIG. 4 discloses an example of reading information available on whiteboard 102 but existing in a separate whiteboard section in accordance with at least one embodiment of the present invention. RN 400 residing on device 200 and RN 402 residing on device 202 need to access data D2. AN 304, acting in a proactive mode, is writing data D2 to whiteboard section 102c residing on device 204. Therefore, while all nodes and data are related to the same whiteboard system, these elements reside on different physical devices.

Both RN 400 and RN 402 may obtain data D2 through wireless communication. As shown in FIG. 4, device 204 may convey the data D2 stored in whiteboard section 102C to whiteboard sections 102A and 102B residing on devices 200 and 202, respectively, via wireless communication. As a result, the information may be made available to RN 400 and RN 402 on their respective devices.

While the exemplary wireless conveyance of information helps to realize the overall strategy of a whiteboard system, secondary problems may be encountered in making this happen as disclosed in FIG. 4. Initially, supplying data D2 to whiteboard sections 102A and 102B is a wireless transaction that occupies available bandwidth and expends power in each device. These burdens on the devices may be acceptable for the short term, but may become detrimental to overall device operation. Initially, a problem may exist if the update rate of the PN device is faster that the request rate of the RN device, which may result in unnecessary messaging. Further, either RN 400 and/or RN 402 could stop consuming D2. This may lead to a waste of resources in providing information to nonexistent consumers. Further one or more of whiteboard sections 102A-C may not have persistent storage available to store data D2. In a general sense, persistent storage is memory that retains information even if power is lost in the device. Therefore, it is advisable to store data in persistent storage, especially on battery powered mobile devices where power may fail unexpectedly. Not having available persistent storage may result in data being received by AN 304 and transmitted by device 204 but not being retained by devices 200 and/or 202. All of these potential problems may lead to unnecessary messaging, which may result in reduced communication efficiency in the plurality of devices, and further, a waste of battery power resulting from the provision of this unnecessary messaging.

II. Whiteboard and Device Management

Figure 5:
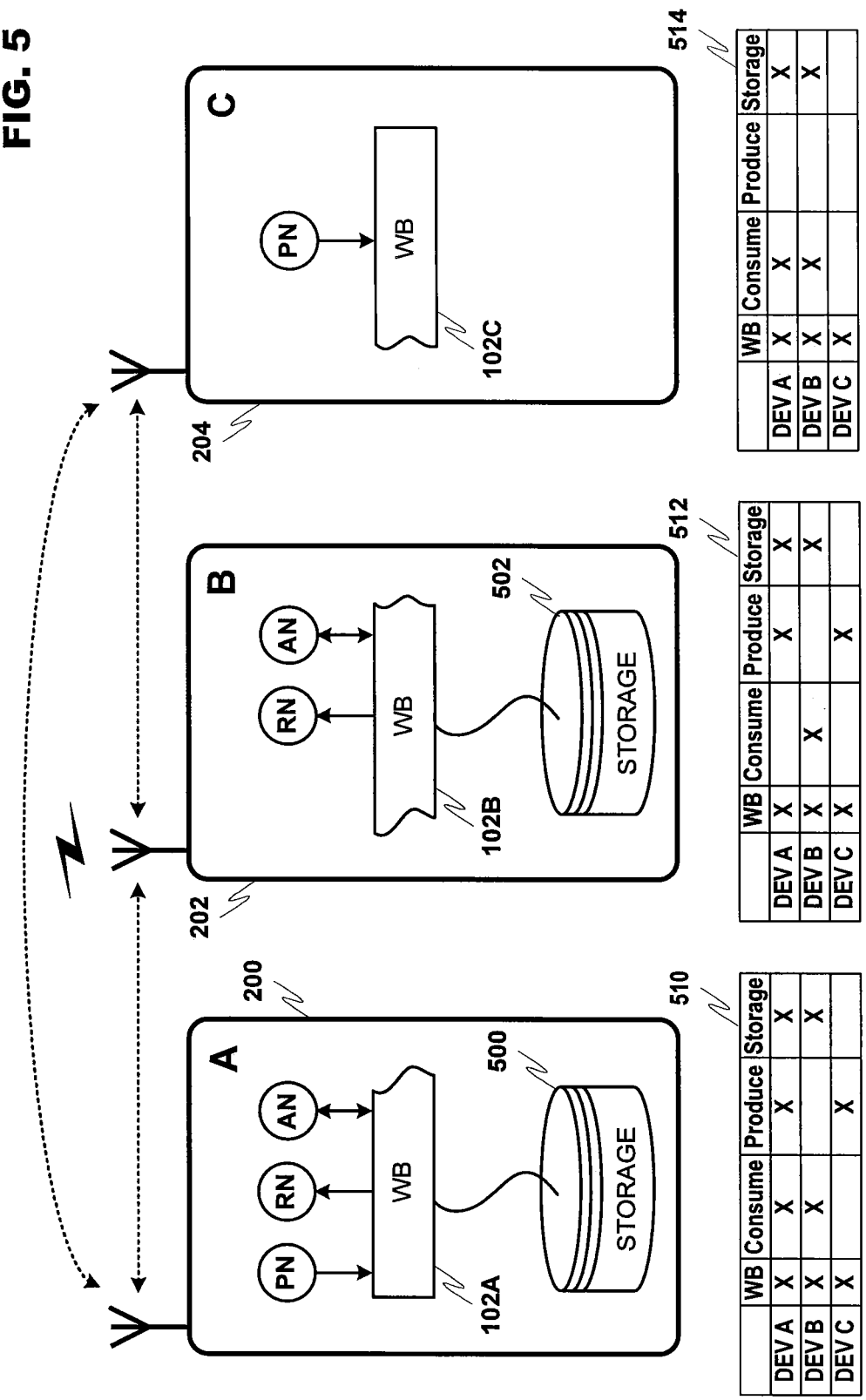
FIG. 5 discloses an example of node activity and resource determination in accordance with at least one embodiment of the present invention.

In accordance with at least one embodiment, the present invention may receive information about the status of both software elements of the whiteboard system and hardware elements such as the plurality of devices in order to manage both system operation and resource consumption. Device characteristics (e.g., amount of memory, active powering mechanism, battery status, etc.) and connectivity information (e.g., which devices are capable of connecting to each other, whiteboard data routing information, etc.) may be utilized to control whiteboard information sharing. FIG. 5 discloses an example embodiment of the present invention, wherein devices 200, 202 and 204 are depicted as coupled via wireless communication. Hardware and software elements at present in each device are further shown in FIG. 5. For example, device 200 (also labeled device "A") has persistent storage 500 which may be coupled to whiteboard section 102A. Whiteboard section 102A may further have one or more nodes coupled to it and resident on device 200 of the aforementioned types RN, PN or AN. Device 202 (also labeled device "B") has a similar configuration including whiteboard section 102b coupled to persistent storage 502. Device 204 (also labeled device "C") includes at least a PN node coupled to whiteboard section 102c, but does not have its own persistent storage. Device 204 may represent, for example, the temperature sensor discussed in the previous example. This device may only contain simple circuitry that allows it to interpret and transmit sensor information without storing the data.

Tables 510, 512 and 514 correspond to devices 200, 202 and 204 respectively. These tables represent information that may be obtained in accordance with at least one embodiment of the present invention which is utilized to further optimize system operation. For example, each device may obtain information about each device supporting whiteboard 102 including whether a device has its resources that support whiteboard 102 enabled ("WB"), whether each device actively has at least one node consuming data ("Consume"), whether each device actively has at least one node producing data ("Produce"), whether each device has persistent storage available ("Storage"), etc. So, in other words, whiteboard 102 may be considered as a shared information space between one or more devices having memory spaces for indicating various requirements regarding various nodes residing in one or more devices. For example, looking at table 510, device 200 may understand that all devices 200, 202 and 204 (A, B and C, respectively) have whiteboard support resources enabled, that it has at least one local node operating in a PN mode producing data for a node acting in an RN node that is also local to device 200, it has at least one node acting in a PN mode producing information for a consuming node (RN or AN) on device 202, device 204 has at least one node producing data for a node local to device 200, and that devices 200 and 202 have available persistent memory for storing data.

On the contrary, device 202 (device B) includes nodes that are currently only consuming information, so table 512 indicates that devices 200 and 204 (A and C, respectively) have nodes that are producing information for local nodes on device 202, but device 202 does not have any nodes acting in a PN or proactive mode. Further, device 204 (device C) contains only one PN and has no local consumers, so the "Produce" column in unmarked in table 514 since no other device is supplying information. However, this device is producing data to the whiteboard for consuming nodes on devices 200 and 202, so the consume column is marked under both devices A and B. Finally, device 204 has no persistent memory, so the storage column is not marked.

Figure 6:
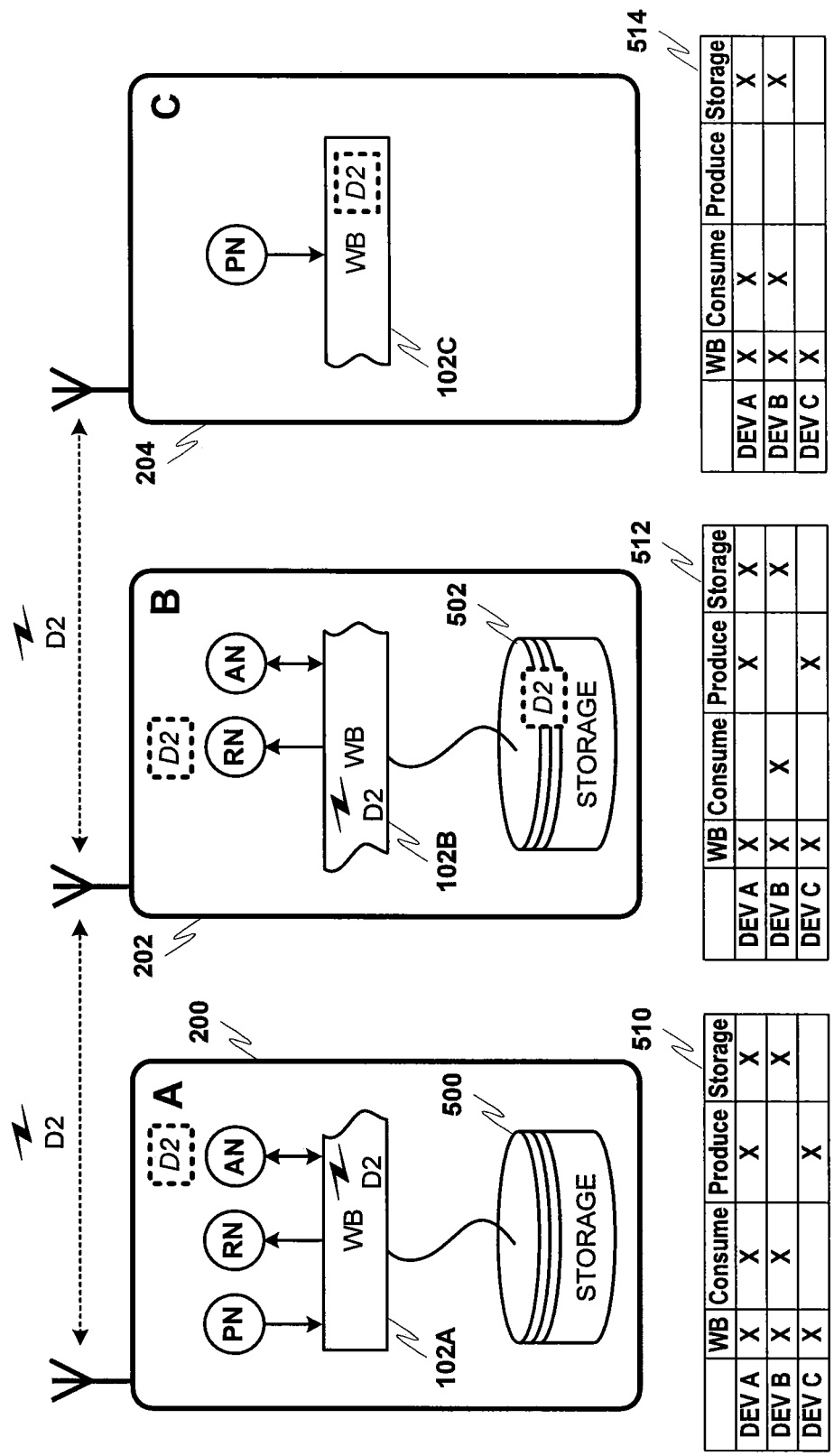
FIG. 6 discloses an example of resource reallocation in view of node activity and resource determination in accordance with at least one embodiment of the present invention.

FIG. 6, in accordance with at least one embodiment of the present invention, discloses an example of optimization and resource management for a whiteboard system. Device 204 has been identified as having no available persistent memory, so data D2 being supplied by the PN on device 204 must be stored elsewhere to ensure data integrity. To account for this lack of memory, the PN in device 204 may supply data D2 to whiteboard section 102C, which may in turn wirelessly transmit data D2 to device 202 where it may be stored in persistent memory and also locally consumed by an RN. Further, the storage of data D2 in persistent memory 502 will make this information available on whiteboard section 102B, which may further be accessible to a consuming AN on device 200 via wireless communication with WB section 102A. This example change in operation has at least improved the data integrity of the system and possibly the accessibility of the whiteboard information. Further, since device 200 may obtain data D2 from device 202, there is no longer a requirement to maintain a wireless link between device 200 and device 204. This reduced communication load for device 204 may be beneficial if the device is resource constrained, such as in the case of a low power wireless temperature sensor.

It is important to note that while a specific resolution involving data placement has been discussed above with respect to the scenario presented in FIG. 6, the actual placement of data in the above example may vary depending on the current condition of the various devices employed in supporting whiteboard 102. As previously disclosed, device and connectivity information (e.g., power levels, available memory, communication activity levels, active nodes, etc.) may be shared amongst the one or more devices, and this information may be used in making decisions regarding system operation. For example, device 204 could also transfer data to the persistent storage of device 200. The end point choice may be based on the connectivity capabilities and physical constraints in addition to the knowledge of active data providers and consumers. Device 204 may make a choice based on it's view of the surrounding environment.

Figure 7:
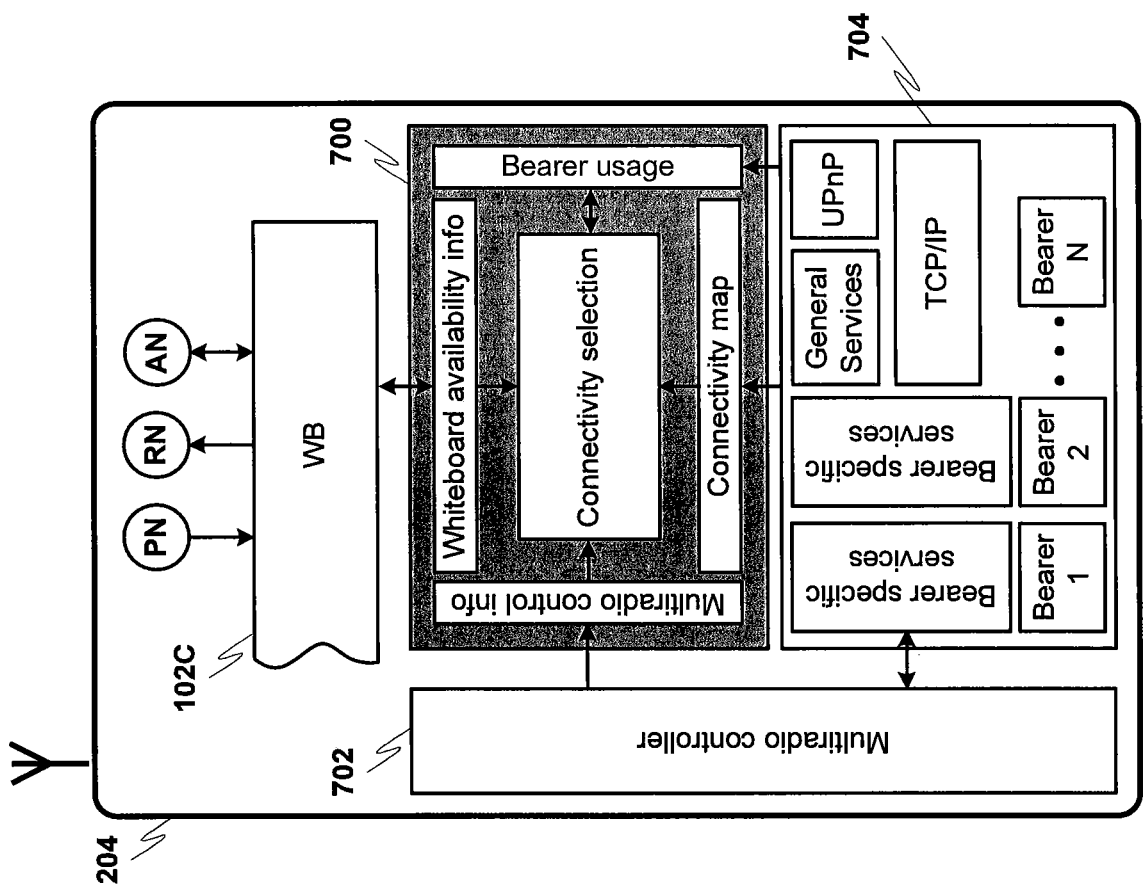
FIG. 7 discloses an exemplary modular layout of a wireless communication device usable with at least one embodiment of the present invention.

Now referring to FIG. 7, a possible modular layout of a device enabled to support a whiteboard system in accordance with at least one embodiment of the present invention is now disclosed. In addition to typical hardware and/or software resources that may be found in a wireless communication device such as one or more processing components, fixed and/or removable memory, communication modules for supporting different wireless communication mediums, an operator interface including input and output components for interacting with the operating system of a device, etc., the exemplary software and/or hardware modules disclosed in FIG. 7 may further be included to support functionality such as previously discussed with respect to the various embodiments of the present invention.

For example, exemplary whiteboard section 102C and the various local nodes interacting with the local whiteboard may interact with a connection controller 700. Connection controller 700 may take as input information from multiradio controller 702 and communication section 704 when determining what adjustments need to be made to optimize whiteboard system operation. Multiradio controller 702 may organize communication for a number of different bearers (e.g., long-range and short-range wireless communication mediums) in exemplary device 204. Each bearer (e.g., bearers 1 to N) may have specific support services in communication section 704. Also general services may exist to support information processing and protocols like TCP/IP. Connection controller 700 may use status information provided from sections 702 and/or 704 in the form of multiradio control information and connectivity map information in conjunction with bearer usage information to determine the status of communication resources in exemplary device 204. This device status information may be compared in the connectivity selection section of connection controller 700 to whiteboard availability information supplied by whiteboard 102C in order to determine an appropriate balance of whiteboard optimization and resource conservation on accordance with at least one embodiment of the present invention.

Figure 8:
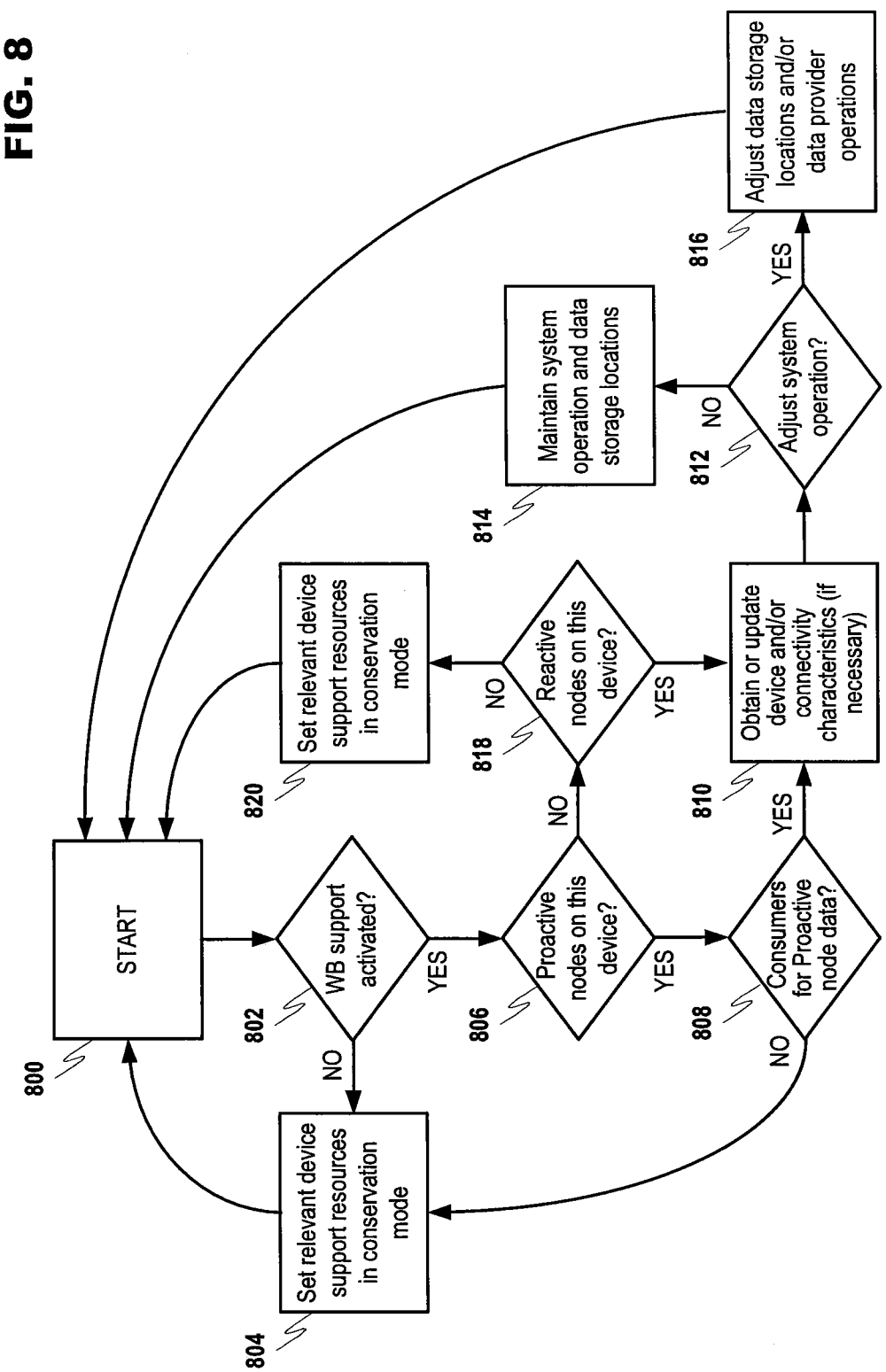
FIG. 8 discloses an exemplary flowchart for determining resource usage and altering device operation in accordance with at least one embodiment of the present invention.

Now referring to FIG. 8, a process for managing whiteboard optimization and device resources in accordance with at least one embodiment of the present invention is now disclosed. The process may start at step 800. An initial determination of whether whiteboard functionality is active in each device may be made in step 802. If whiteboard functionality is not active in any device, then resources for supporting this functionality may be set in a resource conservation mode (e.g., disabled or set in a power save mode) in the affected device in step 804.

For any devices where whiteboard functionality is active, a further determination may be made in step 806 as to whether there are any proactive nodes (PN) exist on any device. If these nodes exist, each device may further determine in step 808 whether there are active consumers (e.g., either reactive nodes (RN) or Agent nodes (AN) acting in a reactive mode) on any section of whiteboard 102 (e.g., on any device). If there are no active consuming nodes, then there is no need for the proactive nodes to continue producing information, and they may be deactivated or placed in a conservation mode in step 804. Alternatively, if there are consumers for the data produced by a particular PN on any of the plurality of supporting devices, then device and/or connectivity characteristics may be evaluated in view of the requirements of the provider and consumer nodes in order to manage the performance of the whiteboard system.

Optional step 810 is provided to demonstrate that the one or more devices supporting the whiteboard system may share information regarding device condition and/or connectivity information in accordance with at least one embodiment of the present invention. However, this step may be deemed optional at this particular point in the process flow because the one or more devices may continually update this information throughout the process flow, and therefore, any connectivity or device information may already be current before step 810.

In step 812, a decision may be made in view of the proactive node information and/or the device/connectivity information as to whether the operation of the system should be adjusted. If no change in system operation is required, then in step 814 the whiteboard system may maintain existing operational and data storage parameters. For example, the presence of persistent storage local to the proactive node may indicate in step 814 that the data provided by the particular proactive node should continue to be stored locally and refreshed in accordance with the rate of that the information is obtained by the proactive node. Otherwise, if the information dictates that a system change is warranted in order to optimize operation, conserve resources, reduce burden, etc., then in step 816 the storage location of data and/or the behavior of proactive nodes may be adjusted. In at least one scenario, if local storage becomes unavailable on a device having at least one proactive node, then in step 816 an evaluation of the one or more devices supporting whiteboard 102 may be performed in order to find a device with available persistent storage in which the data being produced by a particular proactive node may be stored.

Returning to step 806, if there are no proactive nodes on a particular device, then in step 818 a determination may be made as to whether any reactive (RN) nodes exist on each of the plurality of devices supporting the whiteboard system. If no reactive nodes exist on a particular device, then a condition exists where no proactive or reactive nodes exist on that device, and the resources supporting whiteboard functionality on the particular device should be set in a conservation mode (step 820) until activity exists on the device (e.g., as reevaluated by the process as it restarts at 800). In at least one scenario, setting a device in a conservation mode (e.g., a power saving mode) in step 820 may conserve valuable resources on a possibly resource constrained device. On the contrary, if active nodes functioning in a reactive mode (e.g., RN or AN) do exist on a particular device, then the device or connectivity characteristics of the system may be evaluated in view of the requirements of the provider and consumer nodes.

As set forth above, optional step 810 is provided to show that the one or more devices supporting the whiteboard system may share information regarding device and/or connectivity information in accordance with at least one embodiment of the present invention. In step 812, a decision may be made both in view of the proactive/reactive node information and the device/connectivity information as to whether the operation of the system should be adjusted. If no alteration in system operation should be implemented, then in step 814 the whiteboard system may maintain the operational and data storage parameters. For example, similar to the process described above with respect to proactive nodes, the presence of persistent storage local to the reactive node may indicate in step 814 that the data read by the particular reactive node should continue to be stored locally and refreshed according to reactive node requirements.

Otherwise, if a system change is warranted to optimize system operation, conserve resources, reduce burden, etc., then in step 816 the storage location of certain data and/or the operation of data producers may be adjusted. In a more specific example, if local storage becomes unavailable on a device having at least one reactive node, then in step 816 an evaluation of the plurality of devices supporting the whiteboard system may be performed in order to find a device with available persistent storage in which the data being read by the particular reactive node may be stored. Data may then be moved to a new device, and the refresh rate for various data may be adjusted in view of this new storage location (e.g., based on power and/or connectivity information). The process may then restart at step 800 to update system requirement and resource information before the whiteboard management process begins again.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   communicating in a shared information space shared by a plurality of devices and accessible by nodes in the plurality of devices, each node corresponding to a program that at least one of writes information to, or reads information from, the shared information space;
   determining whether at least one node requires information from the shared information space;
   when it is determined that the at least one node requires information, further determining whether operation of the shared information space needs adjusting by exchanging device and connectivity information for each of the plurality of devices communicating within the shared information space, the device and connectivity information comprising at least node information, amount of memory, and battery status; and
   when it is determined that the shared information space needs adjusting, adjusting operation of the shared information space based on the exchanged information.

2. The method of claim 1, wherein the shared information space is a common information space for storing data that is divided between the memories of the plurality of devices.

3. The method of claim 1, wherein the nodes may be of a type including at least proactive nodes, reactive nodes, or agent nodes that can be both proactive and reactive.

4. The method of claim 3, wherein determining whether at least one node requires information from the shared information space includes determining whether any active nodes exist on the plurality of devices, and whether the active nodes are of a proactive, reactive or agent type.

5. The method of claim 4, wherein determining whether at least one node requires information from the shared information space includes determining whether any reactive nodes or agent nodes are consuming information being placed into the persistent memory by an active proactive node.

6. The method of claim 4, wherein determining whether at least one node requires information from the shared information includes determining whether any reactive nodes or agent nodes on one device are consuming information being placed into a persistent memory on another device.

7. The method of claim 3, wherein said proactive nodes include proactive nodes that receive data from electronic or electromechanical sensors.

8. The method of claim 1, wherein adjusting the operation of the shared information space includes changing a location of information stored in a persistent memory.

9. The method of claim 1, wherein adjusting the operation of the shared information space comprises placing resources of the plurality of devices in a power conservation mode.

10. A device, comprising:
    at least one memory; and
    at least one processor, the processor and the at least one memory configured to cause the device to:
    participate in a shared information space shared by a plurality of devices and accessible by nodes in each of the plurality of devices, each node corresponding to a program that at least one of writes information to, or reads information from, the shared information space;
    determine whether at least one node requires information from the shared information space;
    when it is determined that the at least one node requires information, further determine whether operation of the shared information space needs adjusting by exchanging device and connectivity information for each of the plurality of devices communicating within the shared information space, the device and connectivity information comprising at least node information, amount of memory, and battery status;
    when it is determined that the shared information space needs adjusting, adjust operation of the shared information space based on the exchanged information.

11. The device of claim 10, further comprising a connection controller for managing the operation of a whiteboard section resident in the at least one memory.

12. A device, comprising:
    a connection controller for communicating in a shared information space shared by a plurality of devices and accessible by nodes in the plurality of devices, each node corresponding to a program that at least one of writes information to, or reads information from, the shared information space, determining whether at least one node requires information from the shared information space, when it is determined that the at least one node requires information, further determining whether operation of the shared information space needs adjusting by exchanging device and connectivity information for each of the plurality of devices communicating within the shared information space, the device and connectivity information comprising at least node information, amount of memory, and battery status, and when it is determined that the shared information space needs adjusting, adjusting operation of the shared information space based on the exchanged information; and
    at least one memory, at least a portion of the at least one memory allocated to support a portion of the shared information space.

13. The device of claim 12, wherein the connection controller manages the operation of a whiteboard section resident in the at least one memory.

14. A system, comprising:
    a plurality of devices configured for wireless communication;
    the plurality of devices participating in a shared information space accessible by one or more nodes in each of the plurality of devices, each node corresponding to a program that at least one of writes information to, or reads information from, the shared information space;
    at least one of the plurality of devices determining whether at least one node requires information from the shared information space;
    when it is determined that the at least one node requires information, at least one of the plurality of devices further determining whether operation of the shared information space needs adjusting by exchanging device and connectivity information for each of the plurality of devices communicating within the shared information space, the device and connectivity information comprising at least node information, amount of memory, and battery status;

when it is determined that the shared information space needs adjusting, the plurality of devices adjusting operation of the shared information space based on the exchanged information.

15. The device of claim 10, wherein the nodes may be of a type including at least proactive nodes, reactive nodes, or agent nodes that can be both proactive and reactive.

16. The device of claim 15, wherein said proactive nodes include proactive nodes that receive data from electronic or electromechanical sensors.

17. The device of claim 10, wherein the at least one processor and the at least one memory are further configured to cause the device to determine whether any active nodes exist on the plurality of devices, and whether the active nodes are of a proactive, reactive or agent type.

18. The device of claim 17, wherein determining whether at least one node requires information from the shared information space includes determining whether any reactive nodes or agent nodes are consuming information being placed into the shared information space by an active proactive node.

19. The device of claim 17, wherein determining whether at least one node requires information from the shared information space includes determining whether any reactive nodes or agent nodes on one device are consuming information being placed into a persistent memory on another device.

20. The device of claim 10, wherein adjusting the operation of the shared information space includes changing a location of information stored in a persistent memory.

21. The device of claim 10, wherein adjusting the operation of the shared information space comprises placing resources of the plurality of devices in a power conservation mode.

22. The method of claim 1, wherein said device and connectivity information exchanged between the plurality of devices further includes information about whether each device supporting said stored information space is enabled to share, whether each device actively has at least one node consuming data, whether each device actively has at least one node producing data, and availability of persistent storage.

23. The device of claim 10, wherein said device and connectivity information exchanged between the plurality of devices further includes information about whether each device supporting said stored information space is enabled to share, whether each device actively has at least one node consuming data, whether each device actively has at least one node producing data, and availability of persistent storage.

24. The device of claim 12, wherein said device and connectivity information exchanged between the plurality of devices further includes information about whether each device supporting said stored information space is enabled to share, whether each device actively has at least one node consuming data, whether each device actively has at least one node producing data, and availability of persistent storage available.

25. The system of claim 14, wherein said device and connectivity information exchanged between the plurality of devices further includes information about whether each device supporting said stored information space is enabled to share, whether each device actively has at least one node consuming data, whether each device actively has at least one node producing data, and availability of persistent storage.

* * * * *